Patented July 17, 1928.

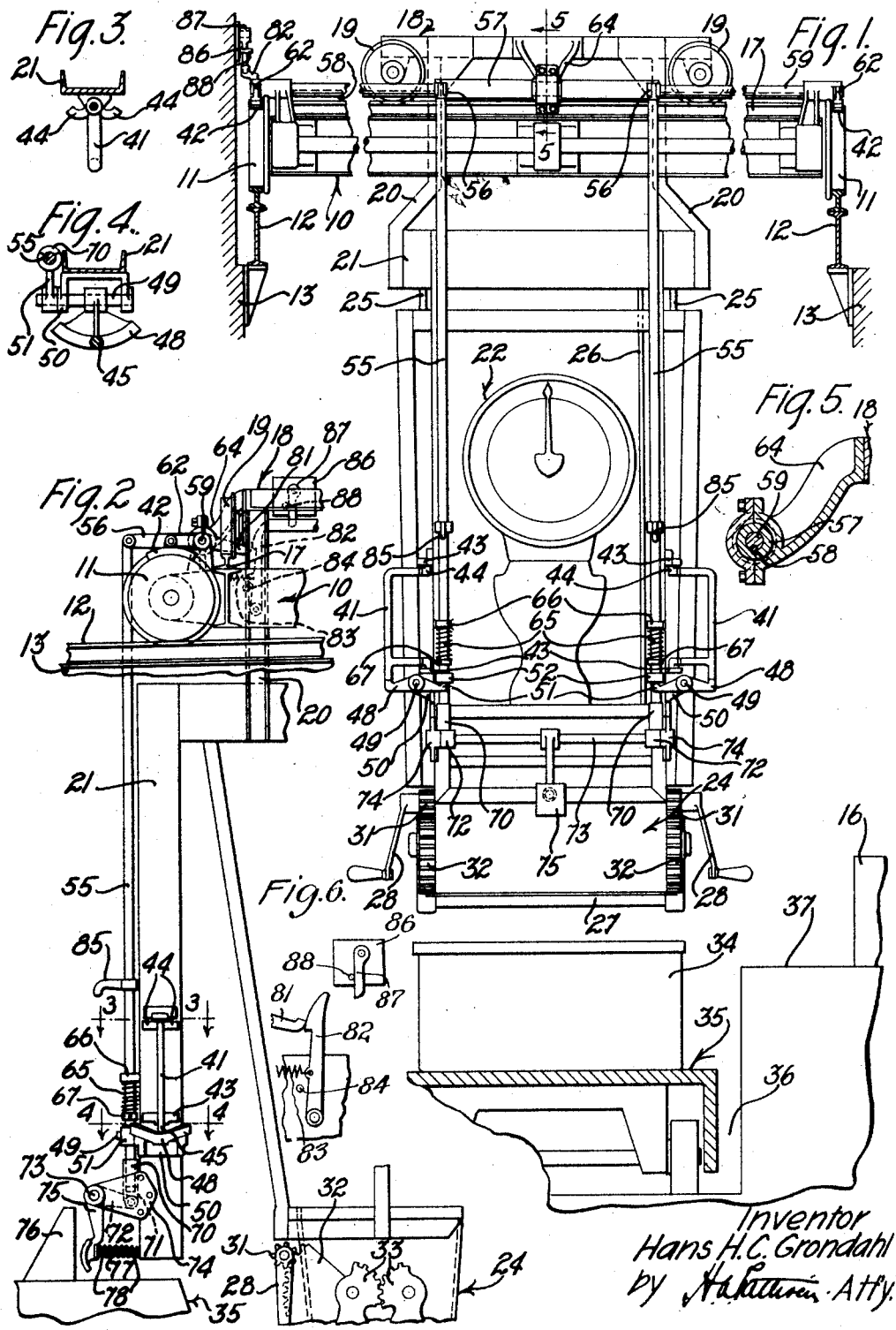

1,677,181

UNITED STATES PATENT OFFICE.

HANS HENRIK CHRISTIAN GRONDAHL, OF CHICAGO, ILLINOIS, ASSIGNOR TO WESTERN ELECTRIC COMPANY, INCORPORATED, OF NEW YORK, N. Y., A CORPORATION OF NEW YORK.

MATERIAL-HANDLING APPARATUS.

Application filed July 31, 1926. Serial No. 126,166.

This invention relates to material handling apparatus, and more particularly to a traveling material handling apparatus.

The primary object of this invention is to provide an efficient and practical brake mechanism for a material handling apparatus.

In accordance with one embodiment of this invention as applied to an overhead runway or track suspended traveling conveyor, there is provided a wheeled carriage equipped with a depending scale and a material carrier, the conveyor being adapted for movement either manually or by a power driven truck in one direction and by gravity in an opposite direction, the track being slightly inclined with respect to the horizontal. The carriage is provided with a brake mechanism normally in operation when the carriage is at a standstill, and which is automatically released during the movement of the conveyor either by a pushing engagement of the truck to move it upwardly along the inclined track or by a movement of a handle provided for manually moving the conveyor along the track. The brake is automatically applied upon the conveyor approaching its normal position at the bottom of the inclined track.

Other objects and advantages of this invention will more fully appear from the accompanying detailed description taken in connection with the accompanying drawings, in which Fig. 1 is a front view of a conveyor of the hereinbefore described type embodying the features of this invention;

Fig. 2 is a fragmentary side view thereof showing a power driven truck in operative position ready to push the conveyor;

Figs. 3 and 4 are enlarged fragmentary plan sectional views on the lines 3—3 and 4—4, respectively, of Fig. 2 looking in the direction indicated by the arrows, and Fig. 5 is an enlarged fragmentary vertical sectional view on the line 5—5 of Fig. 1 looking in the direction indicated by the arrows.

Fig. 6 is a fragmentary sectional view of Fig. 2 showing the latch means for automatically setting the brake when the conveyor arrives at the bottom of the inclined track.

The features of this invention have been shown embodied in a traveling conveyor designed for filling and weighing pans carried upon an electric truck with different kinds of non-ferrous materials taken from supply bins disposed at opposite sides of the conveyor, the filled pans being conveyed to a furnace for melting the materials.

Referring now to the drawing in detail, at 10 is indicated a conveyor comprising a hollow rectangular frame of structural iron and journaling at opposite ends wheels 11 which travel along rails 12 mounted on vertical walls or uprights 13 above supply bins 16. The rails 12, it will be observed (Fig. 2), are disposed at a slight incline, the purpose of which will be made apparent as this description progresses. Upon the upper surface of the conveyor frame, at opposite sides thereof, are rails 17 disposed at right angles to the rails 12. A trolley 18 comprising a hollow rectangular frame of structural iron journals upon opposite side wheels 19 which ride upon the rails 17. Suspended from the trolley 18 by structural iron members 20 is an L-shaped frame 21 which supports a weighing scale 22 and a weighing or dumping pan 24, the latter being suspended from a horizontal arm of the frame 20 by four rods 25, two of which are indicated in Fig. 1. The upper ends of the rods 25 are vertically reciprocable relative to the horizontal arm of the frame 21, and are connected to a leverage mechanism (not shown) enclosed within the horizontal arm of the frame for transmitting the movement of the weighing pan 24, a link 26 extending downwardly from the frame 20 and connected to another leverage mechanism (not shown) in turn directly connected to the scale 22. The scale 22 and its co-operating leverage mechanism is of a well known type and therefore does not require detailed description and illustration as it forms no part of the present invention. The pan 24 is provided with a two section movable bottom 27 (Fig. 1) which may be opened and closed by turning cranks 28 provided at opposite ends of the pan. The cranks 28 each carry a pinion 31 meshing with a gear segment 32 formed integral with one of the bottom sections which also carry meshing gear segments 33 whereby the movement of one section through the movement of either of the cranks 28, pinions 31 and gear segments 32, is simultaneously transmitted to the opposite section, thereby causing the two sections to be rocked in opposite directions and either opening or closing the bottom of the pan 24 depending upon the direction of rotation of the crank 28.

In the particular equipment illustrated in the drawing, a plurality of furnace charging pans 34 are mounted upon an electric truck 35 (Figs. 1 and 2) disposed directly below the conveyor and in a passageway 36 formed between oppositely arranged platforms 37, only one of which is illustrated, the platforms each supporting a plurality of bins 16 for storing different kinds of non-ferrous materials. Although in the drawing for the sake of simplicity only one bin is illustrated upon the single platform 37 shown, it is to be understood that a suitable number of bins are mounted upon the platform, one after the other and arranged parallel to the rails 12. Also, although only one of the pans 24 is shown in the drawing, the truck in actual practice may carry several pans.

It will be apparent that the trolley 18 with the suspended scale 22 and pan 24 may be moved manually from either row of bins 16 to its central position shown (Fig. 1) upon the conveyor 10. To thus move the trolley 18, handles 41 are provided upon opposite sides of the frame 21. The handles also serve to release, as will be presently described, brake shoes 42 normally in braking engagement with the peripheral surface of the wheels 11 at one end of the conveyor 10, the release of the brake shoes occurring during the operation of manually moving the conveyor along the track. As the handles 41 and their co-operating mechanism for transmitting motion to the brake shoes 42 are similar, the following description will apply to both. At its opposite ends the handle 41 is pivoted in bearings 43 mounted upon the scale frame 21, the upper end of the handle being provided with two oppositely extending lugs 44 which, as will be apparent, permit the handle to rock upon its bearings a predetermined distance in each direction until either lug engages the wall of the frame 21 (Fig. 3). The lower end of the handle is provided with a depending central lug 45, which normally rests upon a low point of a cam lever 48 secured to a rock shaft 49 journaled upon a bracket 50 fixed to the frame 21 (Fig. 4). Attached to the left end of the rock shaft 49 (Figs. 2 and 4) is a bifurcated lever 51, the arms of the bifurcated end thereof engaging the under side of a collar 52 fixed to a vertically movable brake rod 55. The upper end of each of the rods 55 is pivotally connected to an arm 56 provided at opposite ends of a horizontally disposed sleeve 57 splined as indicated at 58 (Fig. 5) to a rock shaft 59 supported in bearings integral with the bearings provided for the conveyor wheels 11. Fixed to the ends of the shaft 59 are brake levers 62 to the free ends of which are pivoted the brake shoes 42. The sleeve 57 is attached to the trolley 18 for horizontal movement therewith and arranged to rotate relative thereto by a bracket 64 which thus serves, as will be apparent, to relieve any strain on the brake rods 55 when the trolley 18 is moved upon the conveyor 10. The brake shoes 42 are normally retained in braking engagement with the wheels 11 by means of adjustable compression springs 65 surrounding the brake rods 55, opposite ends of the springs engaging a lug 66 integral with the scale frame 21 and an adjustable collar 67 carried upon the rods 55. Upon the operator grasping either of the handles 41 to either pull or push the conveyor 10 upon the inclined rails 12, it will be apparent that the lug 45 of the handle 41 will ride up one or the other of the inclined faces of the cam lever 48 and thereby rock the shaft 49 and through the movement of the lever 51 (Fig. 1) which engages the collar 52 causing the associated brake rod 55 to be lifted. The upward movement of the rod 55 rocks the arm 56 and sleeve 57 clockwise, as viewed in Fig. 2, and through the spline 58 the shaft 59 with the attached brake levers 62 is similarly rocked, thereby causing the brake shoes 42 to be lifted from the wheels 11 and thus permitting the free travel of the conveyor 10. During the manual movement of the conveyor in either direction one or the other of the lugs 44 will engage the wall of the frame 21, thus bringing the handle to a stop after the complete disengagement of the brake shoes 42 from the wheels 11.

As hereinbefore mentioned, the brake mechanism just described is also automatically released when the electric truck 35 engages the conveyor to push it along the inclined rails 12, which operation takes place when the pans 34 upon the truck have been loaded with the desired amounts of materials from the supply bins 16. The additional mechanism which permits the latter automatic release of the brake shoes 42 will now be described. The lower end of each of the brake rods 55 (Fig. 2) is reciprocably mounted in a cup member 70, the ends of the rods normally spaced a short distance from the inner upper surface of the bottom wall of the cup members to allow for wear upon the brake shoes 42. Depending lugs 71 formed upon each of the cup members are pivotally connected to an arm 72, the opposite ends of the arms being fixed to a rock shaft 73 journaled in bearings 74 secured to the scale frame 21. Attached to the rock shaft 73 between the bearings 74 and centered with respect to the width of the scale frame 21 is a downwardly extending lever 75, the left side of which (Fig. 2) is engaged by a lug 76 extending upwardly from the top surface of the control housing of the truck 35. Interposed between the opposite side of the lever 75 and the front wall of the scale frame 21 is a compression spring 77 which serves to rock the lever 75 in a clockwise direction to its normal position (Fig. 2). The spring 77 is retained in operative relation with the lever 75 by a pair of spaced pins 78 mounted upon the lever 75 and the frame 21, the spacing between the adjacent ends of the springs being such that in operation their engagement does not occur until the brake shoes have been lifted from the wheels 11. Since the conveyor 10 will be raised gradually a slight distance from its normal elevation above the floor line as it travels up the inclined rails 12, the truck 35 traveling upon a horizontal plane, the lug 76 carried by the truck is of such a height that the lever 75 will continue to engage the lug for the entire movement of the truck.

The conveyor 10 is returned to its initial operating position at the bottom of the inclined track by the force of gravity, as hereinbefore mentioned. This occurs after the truck 35 has moved the conveyor up the incline and has departed with its load of materials for the melting furnace. Thus means is provided for rendering the brake shoes ineffective during the return by gravity of the conveyor to its initial position and for automatically rendering the brake shoes effective upon the conveyor nearing the end of its travel down the inclined track. This means will now be described.

The brake lever 62 associated with the left hand side of the conveyor 10 is provided with a rearwardly extending arm 81 (Fig. 2, and for detail Fig. 6) provided with a latch shaped end, which co-operates with a pawl 82 (Figs. 2 and 6) pivotally secured to the end wall of the frame of the conveyor 10. The pawl 82 is normally urged in a counter-clockwise direction by a tension spring 83, its limit of movement being checked by the end of the arm 81 when the brake shoes are in braking engagement and by a pin 84 when the brake shoes are released (Figs. 2 and 6). Fixed to each of the brake rods 55 above the handles 41 is a handle 85 for lifting the brake rods 55 when it is desired to latch the brake shoes 42 into an ineffective position, as mentioned in the preceding paragraph. In operation either of the handles 85 is lifted until the arm 81 which is rocked clockwise is latched under the pawl 82, the spring 83 rocking the pawl counter-clockwise and retaining it in its latched position. Fixed to the left rail supporting wall 13 (Figs. 1, 2 and 6) at a suitable distance from the bottom end of the inclined rails is a plate 86 pivotally supporting a depending trigger 87 which normally rests through gravity against a stop pin 88 carried by the plate 86. The trigger is supported in the path of travel of the pawl 82, the lower end thereof overlapping the upper end of the pawl 82, which is offset a sufficient distance to cause the tripping of the pawl as its rides past the trigger. In the position of the apparatus, as shown in Fig. 2, it may be assumed that the conveyor 10 is at the bottom of the inclined track and consequently the pawl 82 has been released from the arm 81 and the brake shoes applied to the wheels 12 thereby bringing the conveyor to a standstill. In the return movement of the conveyor the pawl will merely idly engage the trigger and swing it about its pivot point, the trigger dropping back against the stop pin 88.

The movement of the handles 41 which are limited by the lugs 44 engaging the scale frame, as hereinbefore described, is sufficient to release the brake shoes but is not great enough to cause the latching of the arm 81 with the retaining pawl 82, as just described.

It is believed that the operation of the herein described material handling apparatus with the automatically controlled brake mechanism applied thereto will be clearly evident from the foregoing description.

What is claimed is:

1. In an apparatus for handling material, a traveling carriage, manually operable means carried by the carriage for moving the latter in either direction, a brake mechanism operatively connected to the means and normally in braking relationship with the carriage, and means controlled by the movement of the manually operable means in either direction for automatically rendering the brake mechanism ineffective.

2. In an apparatus for handling material, a traveling carriage, a manually operable handle carried by the carriage for moving the latter in either direction, a brake device normally in braking relationship with the carriage, and motion transmitting means connecting the handle with the brake device for rendering the latter ineffective when the handle is moved in either direction.

3. In an apparatus for handling material, an elevated runway, a carriage movable along the runway, manually operable means depending from the carriage for moving the latter in either direction upon the runway, a brake mechanism operatively connected to the means and normally in braking relationship with the carriage, and means controlled by the movement of the manually operable means in either direction for automatically rendering the brake mechanism ineffective.

4. In an apparatus for handling material, an inclined runway, a carriage movable along the runway, manually operable means carried by the carriage for moving the latter in either direction upon the runway, a brake mechanism operatively connected to the means and normally in braking relationship with the carriage, means controlled by the movement of the manually operable means in either direction for automatically rendering the brake mechanism ineffective, and a pawl operating upon releasing the brake mechanism a predetermined distance for holding the same ineffective during a movement of the carriage by gravity down the inclined runway.

5. In an apparatus for handling material, an inclined runway, a carriage movable along the runway, manually operable means carried by the carriage for moving the latter upon the runway, a brake mechanism operatively connected to the means and normally in braking relationship with the carriage, means controlled by the manually operable means for automatically rendering the brake mechanism ineffective, latch means for holding the brake mechanism ineffective during a movement of the carriage by gravity down the inclined runway, and means for automatically tripping the latch means to cause the brake mechanism to be effective upon the carriage approaching the bottom of the inclined runway.

6. In an apparatus for handling material, a power driven member, a traveling carriage, a brake mechanism normally in braking relationship with the carriage, and means carried by the carriage and operatively connected to the brake mechanism and operable upon a movement of the carriage by an actuation of the means either manually or by the power driven member to automatically render the brake mechanism ineffective.

7. In an apparatus for handling material, a power driven member, a traveling carriage, a brake mechanism normally in braking relationship with the carriage, and means carried by the carriage and operatively connected to the brake mechanism and operable upon a movement of the carriage by an actuation of the means by the power driven member to automatically render the brake mechanism ineffective.

8. In an apparatus for handling material, an elevated runway, a wheeled carriage movable along the runway, a trolley movable transversely upon the carriage, a material carrier depending from the trolley, a scale frame operatively connected to the carrier for weighing material mounted upon the carrier, the scale frame supported from the trolley and disposed between the latter and the carrier, a manually operable means carried by the scale frame for moving the carriage upon the runway, a brake mechanism operatively connected to the means and normally in braking relationship with the wheeled carriage, and means controlled by the manually operable means for automatically rendering the brake mechanism ineffective.

9. In an apparatus for handling material, an inclined runway, a wheeled carriage movable along the runway, a rigid frame suspended from the carriage, a manually operable pivotal handle carried by the frame for moving the carriage in either direction upon the runway, a brake device normally in braking relationship with the wheeled carriage, and motion transmitting means connecting the handle with the brake device for rendering the latter ineffective when moving the handle in either direction.

10. In an apparatus for handling material, a power driven member, an elevated runway, a wheeled carriage movable along the runway, a rigid frame suspended from the carriage, a manually operable pivotal handle carried by the frame for moving the carriage upon the runway, a brake device normally in braking relationship with the wheeled carriage, motion transmitting means connecting the handle with the brake device for rendering the latter ineffective, and a member supported upon the frame and operatively connected to the motion transmitting means, the member operable upon a movement of the carriage by an actuation thereof by the power driven member to automatically render the brake device ineffective.

11. In an apparatus for handling material, a power driven member, an inclined runway, a wheeled carriage movable along the runway, a trolley movable transversely upon the carriage, a material carrier depending from the trolley, a scale frame upon the trolley and operatively connected to the carrier for weighing material mounted thereupon, a manually operable member carried by the scale frame for moving the carriage upon the runway, a brake device normally in braking relationship with the wheeled carriage, motion transmitting means connecting the member with the brake device for rendering the latter ineffective, a pivotal device upon the frame, means controlled by the device operatively connected to the motion transmitting means, the pivotal device operable upon a movement of the carriage by an actuation thereof by the power driven member to automatically render the brake device ineffective, latch means for holding the brake device ineffective during a movement of the carriage by gravity down the inclined runway, and means for automatically tripping the latch means to cause the brake device to be effective upon the carriage reaching the bottom of the inclined runway.

12. In an apparatus for handling material, a power driven member, a traveling carriage, a manually operable pivotal handle carried by the carriage for moving the latter, a brake device normally in braking relationship with the carriage, a cam lever operatively engaged by the handle, motion transmitting means connecting the handle with the cam lever for rendering the brake device ineffective, means for restoring the brake device to its normal position, a pivotal lever supported by the carriage, and means having a reciprocal operative connection with the motion transmitting means, the pivotal lever operable upon a movement of the carriage by an actuation thereof by the power driven member to automatically render the brake device ineffective.

In witness whereof, I hereunto subscribe my name this 16 day of July A. D., 1926.

HANS HENRIK CHRISTIAN GRONDAHL.